| 106-69. | AU 112 | EX |
| 10-17-72 | OR | 3,698,924 |

United States Patent Office

3,698,924
Patented Oct. 17, 1972

3,698,924
SALINE RESISTANT CEMENTITIOUS BINDERS
George L. Kalousek, Lakewood, and Elton J. Benton, Denver, Colo., assignors to the United States of America as represented by the Secretary of the Interior
No Drawing. Filed May 5, 1970, Ser. No. 34,862
Int. Cl. C04b 7/02
U.S. Cl. 106—89
4 Claims

ABSTRACT OF THE DISCLOSURE

Saline corrosion of concrete at elevated temperatures is prevented by limiting the sulfate content of the cement binder to a level at which the apatite mineral ellestadite will not form.

BACKGROUND OF THE INVENTION

The detrimental effects on concrete of many salt solutions, especially those containing sulfate ion, are well known. It is generally recognized that common, Portland cement-type concretes become subject to attack at concentrations above about 300 p.p.m. Above about 2000 p.p.m., sulfate attack becomes quite severe and special cement formulations are required. Choice of the proper type of cement for concrete structures exposed to sulfate attack is based primarily upon experience gained in practice.

Much of the sulfate-caused corrosion can be traced to formation and crystallization of sulfate-containing compounds within the cement binder paste. Expansion caused by such crystallization results in cracking, spalling and progressive deterioration of the concrete. The most important sulfate-bearing product is cement pastes at ambient temperatures is calcium aluminate trisulfate known as ettringite. This compound forms in many cement binders at room temperature from sulfate ion absorbed from the surroundings.

Formation of ettringite probably causes most of the sulfate corrosion observed at normal concrete use temperatures. However, ettringite is not stable at elevated temperatures so it cannot be responsible for sulfate corrosion observed at such conditions. It has been reported that ettringite does not form in cement pastes cured at 100° C. regardless of the sulfate content (up to 16.5%). Trace amounts were present in cement pastes cured for 24 hours at 90° C. Hence, it can be concluded that the maximum temperature at which ettringite is stable or can form is about 90° C.

Thus, measures taken to prevent sulfate attack at room temperature do not necessarily apply to moderately elevated temperatures, within the range of about 90 to 150° C. yet use of concrete in contact with sulfate-containing brines in that temperature range would be highly advantageous in certain applications such as evaporator chambers in desalination processes, cements for deep oil wells and the like.

SUMMARY OF THE INVENTION

We have now found that the major cause of saline corrosion in cement binder pastes at moderately elevated temperatures is the hydrothermal formation of a sulfate-bearing apatite mineral known as ellestadite. We have also found that formation of this mineral can be prevented by controlling the composition of the cement binder within particular ranges of original sulfate content. Thus we have developed a concrete formulation procedure which makes practical the use of concrete as a structural material in contact with high concentrations of sulfate ion at moderately elevated temperatures.

Hence it is an object of our invention to prevent saline corrosion of concrete at elevated temperatures.

It is a further object of our invention to provide concrete formulations resistant to high concentrations of sulfate ion.

A specific object of our invention is to prevent the deterioration of concrete in contact with sulfate ions at temperatures above about 90° C.

DETAILED DESCRIPTION OF THE INVENTION

We have discovered that concrete can be made resistant to attack from saline solutions at elevated temperatures by controlling the composition of the cementitious binder within certain specified limits. Our cementitious binders find use in concrete or mortar for chambers and conduits of desalination plants, for similar applications in the production of salt from brines, for deep oil well cementing and for other similar applications.

During our research, we found that conventional concrete formulations suffered serious strength losses, exhibited substantial expansion and displayed severe corrosion when exposed to saline solutions at moderately elevated temperatures. The cause of these effects was traced to the hydrothermal synthesis of the mineral ellestadite. Ellestadite is the phosphate-free end member of the isomorphous apatite series having an ideal composition of: $9CaO \cdot 3SiO_2 \cdot 3SO_3 \cdot Ca(F_2,(OH)_2)$. It is slightly soluble in water and hydrolyzes giving a pH of about 9.5 at 25° C. It is unstable and decomposes at lower pH values.

In view of these properties, it would at first appear that ellestadite could not form in concrete exposed to saline solutions since the pH of brines such as sea water is much lower than 9.5. However, we were able to determine that ellestadite did form beneath the surface of concrete where pH remained sufficiently high and where sulfate ions from the brine were able to migrate. Expansion caused by the growth of ellestadite crystals caused progressive rupturing and disintegration of the concrete specimens. In all of our experimental work, ellestadite was identified and characterized by its X-ray diffraction pattern.

After having determined the cause of concrete expansion and corrosion at elevated temperatures to be the formation of ellestadite, we then attempted its synthesis. A number of different binder materials were prepared consisting of blends of Type I or Type V—portland cement with varying amounts of fly ash, electric furnace slags and gypsum. The blends, as pastes having water/cement ratios of 0.25, were cast as cubes and were cured at standard temperatures of 99°, 121° and 143° C. for 7 days. Samples of the cubes were subjected to strength tests and were then crushed, washed with acetone and thoroughly degassed. These dried specimens were then again crushed to pass a 50-mesh screen and were examined by X-ray diffraction and differential thermal analysis.

At the two higher temperatures (121° and 143° C.), ellestadite was observed to develop in some of the binder formulations. Those formulations in which ellestadite had developed also showed abrupt and generally large strength decreases. Both effects (ellestadite formation and strength decrease) in turn were found to be dependent upon sulfate content of the binder paste. Even a slight excess of sulfate beyond a certain optimum amount produced striking differences in strength. Below this optimum sulfate content, ellestadite did not form; above that level, ellestadite did form. The optimum, or critical, sulfate content appears to be set by the amount of sulfate which will substitute into the lattice of the hydrated calcium silicate. If sulfate in excess of that amount is present during the curing process, then ellestadite is formed.

Maximum sulfate content which can be tolerated in a binder depends upon the formulation. Tests for optimum sulfate contents expressed as percent $SO_3$ gave the following results: Type V cement, 2.5% $SO_3$; 70% Type V cement—30% fly ash, 1.4% $SO_3$ and 50% Type V cement—50% ground slag, 1.0% $SO_3$.

In another series of experiments a number of different binder formulations were prepared and formed into 2 by 4 inch paste cylinders. These cylinders were cured at 121° C. and then exposed to two-fold concentrated sea water (77,000 p.p.m. salts) at 121° C. for 241 days. Six different compositions were selected for detailed analysis. L the turnings were gathered at selected depths beneath the surface of the cylinders for X-ray diffraction analysis in order to determine ellestadite concentration. These data are presented in tabular form as follows:

TABLE I

| Sample No. | Binder formulation | Sulfate content (percent $SO_3$) | Original ellestadite concentration (counts per second) | Expansion, percent | Maximum ellestadite concentration (counts per second) | Depth of maximum ellestadite concentration (inch) |
|---|---|---|---|---|---|---|
| 1 | 70% cement, 30% fly ash | 1.4 | 0 | 0.029 | 0 | |
| 2 | 50% cement, 50% slag | 1.0 | 0 | .022 | 0 | |
| 3 | Type V cement | 2.0 | 53 | .070 | 108 | 0.005 |
| 4 | Type I cement | 2.0 | 53 | .068 | 110 | 0.025 |
| 5 | Type V cement | 3.5 | 109 | .120 | 170 | 0.015 |
| 6 | Type I cement | 3.5 | 105 | .100 | 190 | 0.025 |

Ellestadite concentration is given in relative units in counts per second of the 2.82 A. line using an X-ray diffractometer. Expansion was determined by use of 1 x 1 x 11 inch reference prisms. In all cases, ellestadite content was zero at the surface of the test specimens in contact with the sulfate-containing brine.

Results of these tests clearly show the expansive nature of ellestadite. More importantly, these results show that if the sulfate content of a cementitious binder is kept below a level at which ellestadite does not form during curing, then ellestadite will not form upon lengthy exposure to high concentrations of sulfate ion at elevated temperatures. Conversely, if the sulfate content of the binder is sufficiently high to allow ellestadite formation during curing, then exposure to a sulfate brine results in additional ellestadite growth. This causes expansion of the binder, substantially lowered strength, and progressive deterioration of the binder material.

Those compositions in Table I in which ellestadite did not form are illustrative of binders resistant to saline attack at elevated temperatures. Other proportions of cement of various types, preferably in admixture with slag, fly ash or other pozzolans yield comparably satisfactory results, provided of course that the sulfate content is controlled so as to prevent ellestadite formation. Generally, cements without pozzolans but of low sulfate contents, within the range of about 0.5 to 1.5%, may be used but are less desired. Because of the inversion of hydrous calcium silicate to alpha dicalcium silicate hydrate displayed by such cements, a binder of low strength having free calcium hydroxide would be produced. Our most preferred saline resistant binder composition comprises approximately a 50:50 blend by weight of either Type I or V cement and slag with a total sulfate content on the order of 1%.

What is claimed is:

1. A method for preparing a cementitious binder which comprises:
   (a) mixing water and a material chosen from the group consisting of Portland-type cement and mixtures of Portland-type cement with finely divided pozzolans to form a paste;
   (b) limiting the sulfate content of the paste components to a level below which ellestadite will not form; and
   (c) curing the paste at a temperature above about 90° C. to produce a cementitious binder which is characterized by resistance to corrosion from sulfate-containing waters at temperatures above 90° C.

2. The method of claim 1 wherein the finely divided pozzolan is chosen from the group consisting of fly ash and slag.

3. The process of claim 2 wherein the cementitious binder is associated with aggregate to form a concrete.

4. The purpose of claim 3 wherein the cementitious binder comprises about 50% cement and about 50% slag and has a sulfate content of about 1%.

References Cited
UNITED STATES PATENTS

| 2,880,100 | 3/1959 | Ulfstedt | 106—89 |
| 2,083,179 | 6/1937 | Work | 106—100 |
| 3,194,673 | 7/1965 | Schedel | 106—100 |

OTHER REFERENCES

Lea & Desch: The Chemistry of Cement and Concrete, Edward Arnold (Publishers) Ltd., London, 1956, pp. 15, 153.

JAMES E. POER, Primary Examiner

U.S. Cl. X.R.
106—97, 117